United States Patent [19]

Ueno et al.

[11] Patent Number: 4,789,497
[45] Date of Patent: Dec. 6, 1988

[54] PROCESS OF USING A DEHYDRATION REAGENT FOR WASHED FISH HEAT

[75] Inventors: Ryuzo Ueno, Nishinomiya; Tatsuo Kanayama, Takarazuka; Toshitaka Nakashima; Itami; Kunihiko Tomiyasu, Takarazuka; Toshio Matsuda, Itami, all of Japan

[73] Assignee: 501 Ueno Seiyaku Kabushiki Kaisha, Osaka, Japan

[21] Appl. No.: 97,360

[22] Filed: Sep. 8, 1987

Related U.S. Application Data

[62] Division of Ser. No. 819,622, Jan. 17, 1986.

[30] Foreign Application Priority Data

Jan. 21, 1985 [JP] Japan .................................. 60-7421
Aug. 7, 1985 [JP] Japan ................................ 60-172379

[51] Int. Cl.$^4$ ............................................. C09K 3/00
[52] U.S. Cl. ..................................... 252/194; 426/652
[58] Field of Search ................ 252/173, 194; 426/431, 426/652

[56] References Cited

U.S. PATENT DOCUMENTS

| | | | |
|---|---|---|---|
| 2,988,509 | 6/1961 | Schilberg | 252/194 X |
| 3,870,805 | 3/1975 | Hayes et al. | 426/431 X |
| 4,224,349 | 9/1980 | Gooch et al. | 426/652 X |
| 4,454,161 | 6/1984 | Okada et al. | 426/651 X |
| 4,476,112 | 10/1984 | Aversano | 426/652 X |
| 4,551,351 | 11/1985 | Kawasaki et al. | 426/657 X |

Primary Examiner—Peter A. Nelson
Attorney, Agent, or Firm—Wegner & Bretschneider

[57] ABSTRACT

The present invention provides a dehydrating reagent which, in the production of frozen ground fish meat, enables the dehydration of fish meat after washing with water and improves the quality of frozen ground fish meat obtained. Such effects are achieved by the combination of magnesium and/or calcium ions and sodium ions.

14 Claims, No Drawings

PROCESS OF USING A DEHYDRATION REAGENT FOR WASHED FISH HEAT

This application is a divisional of U.S. application Ser. No. 819,622, filed Jan. 17, 1986, now abandoned.

BACKGROUND OF THE INVENTION:

The present invention relates to a dehydrating reagent which, in the production of frozen ground fish meat, enables the dehydration of fish meat after washing with water and besides improves the quality of frozen ground fish meat obtained.

Blanching and dehydration in the production of frozen ground fish meat are closely related and important steps. The objects of washing is to remove factors causing the denaturation of proteins during freezing and substances inhibiting the development of "ashi" (refers to stiffness with elasticity) essential to fish paste products as well as improve the appearance of "surimi" (referres to ground fish meat), so that insufficient washing cannot give "surimi" of high commercial value. On the other hand, sufficient washing swells fish meat because an extra water is contained in the fish meat, so that the fish meat in such state cannot be used as a material for "surimi". Dehydration becomes necessary to remove this extra water. In dehydration, the ease of dehydration, the so-called "squeezing", of fish meat has a great effect on the production efficiency of "surimi". Of factors having an effect on this ease of dehydration, the inner ones include freshness, fishing time, fishing ground, original water-retaining power of fish meat, etc., and the outer ones include mechanical operation, equipment, temperature and quality of water, etc. As described above, the ease of "squeezing" of fish meat is determined by various factors, and generally, the dehydration of fish meat is considered to be worst in winter. It seems that this is strongly due to the highness of the water holding capacity (WHC) of fish meat and the lowness of the water temperature, and those in this trade have a strong demand for improvement in the dehydration in this period of year.

The well-known method to improve the dehydration is to add sodium chloride, magnesium chloride or calcium chloride alone at the time of washing. This addition promotes the bonding of proteins with Na, Mg or Ca ions on washing, resulting in reduction in the charge of proteins and ease of dehydration. This swelling-inhibiting effect works best at an ionic strength of 0.05 to 0.1, but Na ions are fairly inferior in this effect to Mg or Ca ions. This seems to be due to difference in the bonding strength of these ions. As other effects of this addition, inhibition of protein elution is given. This protein elution-inhibiting effect is highest at an ionic strength of 0.04 to 0.06, and the amount of protein eluted increases as the ionic strength is far away from this range. From this information, it is considered to be desirable to add magnesium chloride or calcium chloride so that the ionic strength reaches about 0.05.

Addition of magnesium chloride or calcium chloride is surely effective in terms of improvement in the dehydration, but it largely affects meat quality to deteriorate the quality itself. Thus, this causes problems of lowering the quality of "surimi" itself obtained, for example the "ashi"-developing ability of fish paste products, as well as of promoting the denaturation of "surimi" on freezing due to the presence of $Mg^{2+}$ or $Ca^{2+}$ ions.

SUMMARY OF THE INVENTION

The object of the present invention is to provide dehydrating assistants which are useful in increasing the rate of dehydration of washed fish meat to improve the quality of frozen ground fish meat, especially the quality of fish-paste product obtained from the frozen ground fish meat. In order to achieve the above object the present invention provides a dehydrating reagent for washed fish meat containing (A) an alkaline earth metal salt selected from the group consisting of magnesium chloride, calcium chloride, magnesium sulfate and calcium sulfate, and (B) sodium chloride in a proportion of one part by weight to 0.5 to 40 parts by weight of (A) to (B).

DETAILED DESCRIPTION OF THE INVENTION

The present invention relates to a dehydrating reagent for washed fish meat, which comprises (A) an alkaline earth metal salt selected from the group consisting of magnesium hloride, calcium chloride, magnesium sulfate and calcium sulfate, and (B) sodium chloride in a proportion of one part by weight to 0.5 to 40 parts by weight of (A) to (B).

In the present specification the "part" refers to a compound which may contain crystalline water, especially commercially available one, such as $CaCl_2.2H_2O$, $MgCl_2.6H_2O$, $CaSO_4.2H_2O$, $MgSO_4.7H_2O$ and the like.

A suitable concentration of the magnesium ion and/or calcium ion to improve the dehydration of the branched fish meat is 0.00125 to 0.02 in terms of ionic strength, and higher concentrations than the above may affect meat quality. Further, $Na^+$ ion itself has a good protein elution-inhibiting effect at an ionic strength of 0.04 to 0.06, but the combination of $Na^+$ with $Mg^{2+}$ and/or $Ca^{2+}$ is good in the effect at an ionic strength of 0.0125 to 0.075.

Therefore, it is preferable that the dehydrating reagent of the present invention is added to washing water in amounts of 0.05 to 0.5 wt. %, preferably 0.1 to 0.4 wt. % based thereon. By such an addition the ionic strength of the water can be controlled within a range of 0.0125 to 0.075, preferably 0.018 to 0.065.

The (A):(B) ratio of the dehydrating reagent is 1:0.5–40 (by weight), and it is 1:0.5–20 (by weight), more preferably 1:2'10 (by weight) for the case wherein the both components are a chloride. Higher proportions of sodium chloride than this give no sufficient dehydrating effect, and lower proportions cause the deterioration of "surimi".

By the use of the dehydrating reagent of the present invention, improvement in the dehydration of washed fish meat can be attained to the same degree as in the single use of magnesium or calcium ions (ion strength, 0.05), and dehydration operation becomes easy to result in improvement in production efficiency; besides the elution of fish meat protein is prevented to result in an increase in the yield of the protein. Also, the dehydrating reagent of the present invention has a very little influence on the quality of fish meat, so that "surimi" of excellent quality can be obtained. It was further found that the dehydrating reagent has an unexpected effect of improving the whiteness of "surimi" or fish paste products.

Typical alkaline metal salts used in the present invention include chlorides (e.g. magnesium chloride, calcium chloride) and sulfates (e.g. magnesium sulfate, calcium sulfate). Any of these salts has a good dehydrating effect, but the chlorides are so strongly hygroscopic that they tend to be deliquescent. Consequently, handling of the chlorides requires a great care, and it is not desirable to keep them exposed to air for a long time or use them in highly humid conditions. Also, there may occur a problem of caking of the chlorides due to such handling. Besides, inorganic chlorides such as magnesium chloride and calcium chloride largely corrode metals and therefore the sulfates are more preferred.

The pH of the washing water is another factor to exert a strong effect on the water holding capacity (WHC), in other words, dehydration, of fish meat. The (WHC) of fish meat is weakest at a pH of 5 to 6, and the dehydration improves within this range, but the washed fish meat obtained becomes low in the so-called "ashi"-developing ability to reduce the quality of "surimi" obtained. The fish meat protein is most stable at a pH of 7 to 8, but in this pH range, the WHC of fish meat is so strong that the dehydration is not easy.

The dehydration-improving effect of the present dehydrating reagent is hardly affected by the pH of washing water, and therefore, it becomes possible to carry out washing in a pH region wherein fish meat protein is kept stable, by adding alkaline substances in addition to the dehydrating reagent.

The alkaline substance acting as a pH-regulating agent includes alkali hydroxides, alkali carbonates, alkali hydrogencarbonates, alkali tertiary phosphates, dialkali hydrogenphosphates, condensed alkali phosphates, the alkali salt of organic acids and the like. The foregoing alkali compounds include alkali metal or alkaline earth metal compounds, i.e. compounds of sodium, potassium, calcium, magnesium, etc. Specifically, there are given sodium hydroxide, potassium hydroxide, sodium carbonate, potassium carbonate, magnesium carbonate, calcium carbonate, sodium hydrogencarbonate, sodium tertiary phosphate, potassium tertiary phosphate, disodium hydrogenphosphate, dipotassium hydrogenphosphate, sodium pyrophosphate, potassium pyrophosphate, sodium polyphosphate, potassium polyphosphate, sodium metaphosphate, potassium metaphosphate, sodium citrate, potassium citrate, sodium acetate, calcium acetate, sodium tartrate, potassium tartrate, calcium lactate and the like. Of these, sodium hydrogencarbonate, sodium carbonate, potassium carbonate, sodium citrate and sodium acetate are preferred.

The amount of the alkaline substance added is not more than 10 wt. %, preferably not more than 5 wt % based on the toral weight of the calcium and/or magnesium salts and sodium chloride. Amounts exceeding 10 wt. % give no sufficient dehydrating effect.

The dehydrating reagent of the present invention comprises a mixture of the foregoing magnesium and/or calcium salts, sodium chloride and the alkaline substance if necessary, which mixture may be a powdery preparation or a liquid preparation prepared by adding water to the powdery preparation. In preparing the liquid preparation, when precipitates are formed by adding the alkaline substance, it is desirable to separately prepare a solution of the alkaline substance or to reduce the concentration of the liquid preparation.

In washing, water is generally renewed several times. A time to add the dehydrating reagent of the present invention is not particularly limited, but addition at the time of final washing is most preferred in terms of the development of the effect and economies.

For adding the dehydrating reagent to washing water, the powdery or liquid preparation may be added as such, or the liquid preparation may be added as aqueous dilute solutions. There is no need to add the alkaline substance simultaneously with sodium chloride, etc., and the substance may be added before or after the other components.

The present invention will be illustrated with reference to the following experimental examples.

EXAMPLE 1

Walleye pollack of good freshness after fishing and landing the day before test and cold-storage in a stock tank for one night, was disjointed as usual into dress which was then washed on a rotary drum-type washing machine and passed through a roll-type separator to obtain fish meat (hereinafter referred to as "fish meat from separator"). This fish meat from separator was placed in the first washing tank and washed with 3 to 4 times its weight of water and drained on a rotary sieve. After repeating this blanching/draining cycle two times, the fish meat was placed in the second washing tank, drained as such on a rotary sieve without adding sodium chloride, and passed through a refiner to remove contaminants such as black skins, tendon, blood-colored meat, etc. The fish meat thus obtained is hereinafter referred to as "fish meat from refiner". The fish meat from refiner was stirred and mixed in a mixer so that its water distribution was uniform and then devided into portions of 60 kg each. The water content of this fish meat from refiner was 94.0%. Thereafter, 60 kg each of the fish meat from refiner was added to washing tanks containing 120 liters of aqueous solutions (twice the fish meat from refiner) of which the concentration (ion strength) was adjusted as shown in Table 1 by combining NaCl and $MgCl_2$ in varying proportions, stirred and mixed for 5 minutes, predehydrated on a rotary sieve and then dehydrated on a small screw press by applying the same number of revolutions (notch, 0.5) to obtain pressed meat of every plot. To the pressed meat were added 6% of sugar and 0.25% of condensed phosphate, and the mixture was mixed for 10 minutes on a small mixer. The "surimi" obtained was frozen at $-30°$ C. in an air-blast freezer. It took 3 to 5 hours for freezing.

One day after freezing (just after freezing), the frozen "surimi" was thawed, and to 3 kg of the "surimi" obtained were added 3% of sodium chloride and 5% of potato starch. The mixture was stirred and mixed for 13 minutes on a silent cutter, filled in a polyvinylidene chloride casing and heated for 30 minutes in a 90° C. hot water to produce "kamaboko" (boiled fish paste). The pressed meat, "surimi" and "kamaboko" were measured for yield, weight of solid matter, water content and pH. The result is shown in Table 1. The mixing weight ratio of $MgCl_2.6H_2O$ to NaCl was 1:16.3, 1:7.7, 1:3.4, 1:1.8 and 1:0.9 for the test plots 2, 3, 4, 5 and 6, respectively. In the table, I.S means ionic strength, and the yield is one based on the fish meat from refiner.

TABLE 1

| test plots | yield | | | | water content (%) | | | pH | | |
|---|---|---|---|---|---|---|---|---|---|---|
| | pressed meat | | solid in pressed meat | | | | | | | |
| | weight (kg) | percentage (%) | weight (kg) | percentage (%) | pressed meat | surimi | kamaboko | pressed meat | surimi | kamaboko |
| 1. NaCl (I.S = 0.05) | 19.7 | 32.8 | 2.6 | 72.2 | 87.1 | 81.8 | 76.5 | 7.32 | 7.61 | 7.42 |
| 2. NaCl (I.S = 0.0475) MgCl$_2$ (I.S = 0.0025) | 18.8 | 31.3 | 2.6 | 72.2 | 86.0 | 80.6 | 75.4 | 7.30 | 7.60 | 7.39 |
| 3. NaCl (I.S = 0.045) MgCl$_2$ (I.S = 0.005) | 17.1 | 28.5 | 2.7 | 75.0 | 84.5 | 79.8 | 74.4 | 7.32 | 7.56 | 7.32 |
| 4. NaCl (I.S = 0.04) MgCl$_2$ (I.S = 0.01) | 16.5 | 27.5 | 2.8 | 77.8 | 83.1 | 79.2 | 73.7 | 7.28 | 7.50 | 7.27 |
| 5. NaCl (I.S = 0.03) MgCl$_2$ (I.S = 0.02) | 16.0 | 26.7 | 2.9 | 80.6 | 82.0 | 77.7 | 72.7 | 7.26 | 7.47 | 7.13 |
| 6. NaCl (I.S = 0.025) MgCl$_2$ (I.S = 0.025) | 15.6 | 26.0 | 2.9 | 80.6 | 81.5 | 77.3 | 72.3 | 7.19 | 7.42 | 7.09 |

*weight of fish meat from refiner: 60 kg
*weight of solid in fish meat from refiner: 3.6 kg From this result, it is seen that when NaCl and MgCl$_2$ are combined so that the ionic strength (I.S) is 0.05, as the proportion of MgCl$_2$ becomes large, the pressed meat becomes low in the water content, and also becomes good in the yield of solid matter, which shows that the protein elution-inhibiting effect is strong.

EXAMPLE 2

Walleye pollack of good freshness after fishing and landing the day before test and cold-storage in a stock tank for one night, was disjointed as usual into dress which was then washed on a rotary drum-type washing machine and passed through a roll-type separator to obtain "fish meat from separator". This fish meat from separator was placed in the first washing tank and washed with 3 to 4 times its weight of water and drained on a rotary sieve. After repeating this blanching/draining cycle two times, the fish meat was placed in the second washing tank, drained as such on a rotary sieve without adding sodium chloride, and passed through a refiner to remove contaminants such as black skins, tendon, blood-colored meat, etc to obtain "fish meat from refiner". The fish meat from refiner was stirred and mixed in a mixer to that its water distribution was uniform and then divided into portions of 60 kg each. the water content of this fish meat from refiner was 94.5%. Thereafter, 60 kg each of the fish meat from refiner was added to washing tanks containing 120 liters of aqueous solutions (twice the fish meat from refiner) of which the concentration (ion strength) was adjusted as shown in Table 2 by combining NaCl and MgSo$_4$ in varying proportions, stirred and mixed for 5 minutes, predehydrated on a rotary sieve and then dehydrated on a small screw press by applying the same number of revolutions (notch, 0.4) to obtain pressed meat of every plot. To the pressed meat were added 6% of sugar and 0.25% of condensed phosphate, and the mixture was mixed for 10 minutes on a small mixer. The "surimi" obtained was frozen at −30° C. in an air-blast freezer. It took 3 to 5 hours for freezing.

One day after freezing (just after freezing), the frozen "surimi" was thawed, and to 3 kg of the "surimi" obtained were added 3% of sodium chloride and 5% of potato starch. The mixture was stirred and mixed for 13 minutes on a silent cutter, filled in a polyvinylidene chloride casing and heated for 30 minutes in a 90° C. hot water to produce "kamaboko" (boiled fish paste). The pressed meat, "surimi" and "kamaboko" were measured for yield, weight of solid matter, water content and pH. The result is shown in Table 2. The mixing weight ratio of MgSO$_4$.7H$_2$O to NaCl was 1:37.0, 1:18.0, 1:8.5, 1:3.8, 1:1.4 and 1:0.9 for the test plots 2, 3, 4, 5, 6 and 7, respectively. In the table, I.S means ionic strength, and the yield is one based on the fish meat from refiner.

TABLE 2

| test plots | yield | | | | water content (%) | | | pH | | |
|---|---|---|---|---|---|---|---|---|---|---|
| | pressed meat | | solid in pressed meat | | | | | | | |
| | weight (kg) | percentage (%) | weight (kg) | percentage (%) | pressed meat | surimi | kamaboko | pressed meat | surimi | kamaboko |
| 1. NaCl (I.S = 0.05) | 19.2 | 32.0 | 2.3 | 69.7 | 88.0 | 82.8 | 77.0 | 7.35 | 7.65 | 7.45 |
| 2. NaCl (I.S = 0.04875) MgSO$_4$ (I.S = 0.00125) | 19.0 | 31.7 | 2.4 | 72.7 | 87.5 | 82.4 | 76.6 | 7.35 | 7.64 | 7.41 |
| 3. NaCl (I.S = 0.0475) MgSO$_4$ (I.S = 0.0025) | 18.1 | 30.1 | 2.5 | 75.8 | 86.1 | 81.0 | 75.4 | 7.34 | 7.63 | 7.40 |
| 4. NaCl (I.S = 0.045) MgSO$_4$ (I.S = 0.005) | 17.5 | 29.2 | 2.7 | 81.8 | 84.8 | 79.8 | 74.2 | 7.34 | 7.62 | 7.35 |
| 5. NaCl (I.S = 0.04) MgSO$_4$ (I.S = 0.01) | 16.0 | 26.7 | 2.7 | 81.8 | 83.1 | 75.4 | 72.7 | 7.30 | 7.57 | 7.26 |
| 6. NaCl (I.S = 0.03) MgSO$_4$ (I.S = 0.02) | 15.2 | 25.3 | 2.8 | 84.8 | 82.6 | 74.9 | 72.3 | 7.28 | 7.50 | 7.19 |
| 7. NaCl (I.S = 0.025) MgSO$_4$ (I.S = 0.025) | 15.0 | 25.0 | 2.8 | 84.8 | 82.1 | 74.5 | 71.9 | 7.22 | 7.45 | 7.15 |

*weight of fish meat from refiner: 60 kg
*weight of solid in fish meat from refiner: 3.3 kg From this result, it is seen that when NaCl and MgSO$_4$ are combined so that the ionic strength (I.S) is 0.05, as the proportion of MgSO$_4$ becomes large, the pressed meat becomes low in the water content, and also becomes good in the yield of solid matter, which shows that the protein elution-inhibiting effect is strong.

EXAMPLE 3

In the same manner as in Example 1, fish meat from refiner was produced and adjusted in a mixer so that the water distribution was uniform, and divided into portions of 70 kg each. The water content of this fish meat from the refiner was 94.4%. Thereafter, 70 kg each of the fish meat from refiner was added to washing tanks containing 140 liters of aqueous solutions (twice the fish meat from refiner) of which the concentration (ion strength) was adjusted as shown in Table 3 by combining NaCl, $MgCl_2$ and $CaCl_2$, stirred and mixed for 5 minutes, pre-dehydrated on a rotary sieve and then dehydrated on a small screw press by applying the same number of revolutions (notch, 0.5) to obtain pressed meat of every test plot. In the same manner as in Example 1, frozen "surimi" and "kamaboko" were produced from this pressed meat and tested. The result is shown in Table 3. The elasticity of "kamaboko" was measured by the following methods.

Sensory test: Elasticity ("ashi") was tested according to the 10-grade method (10, very strong; 5, common; 1, very weak) using 6 panels, and expressed by the mean value of the marks of 6 panels.

Mechanical test: The test was carried out on a food rheometer (produced by Fudo Kogyo Co.) using a spherical plunger of 5 mm in diameter. W(g): load at the time of break. L(cm): length of intrusion (depth of hollow) of the plunger at the time of break.

of NaCl with $MgCl_2$ improves the yield of solid matter of the pressed meat, inhibits the elution of proteins and besides has little effect on the elasticity (L value) of "kamaboko".

EXAMPLE 4

In the same manner as in Example 2, fish meat from refiner was produced and adjusted in a mixer so that the water distribution was uniform, and divided into portions of 60 kg each. The water content of this fish meat from refiner was 94.2%. Thereafter, 60 kg each of the fish meat from refiner was added to washing tanks containing 120 liters of aqueous solutions (twice the fish meat from refiner) of which the concentration (ion strength) was adjusted as shown in Table 4 by combining NaCl, $MgSO_4$ and $CaSO_4$, stirred and mixed for 5 minutes, pre-dehydrated on a rotary sieve and then dehydrated on a small screw press by applying the same number of revolutions (notch, 0.5) to obtain pressed meat of every test plot. In the same manner as in Example 2, frozen "surimi" and "kamaboko" were produced from this pressed meat and tested. The result is shown in Table 4. The elasticity of "kamaboko" was measured by the following methods.

Sensory test: Elasticity ("ashi") was tested according to the 10-grade method (10, very strong; 5, common; 1, very weak) using 6 panels, and expressed by the mean value of the marks of 6 panels.

Mechanical test: The test was carried out on a food

TABLE 3

| | yield | | | | water content (%) | | | pH | | | elasticity of kamaboko | | |
|---|---|---|---|---|---|---|---|---|---|---|---|---|---|
| | pressed meat | | solid in pressed meat | | | | | | | | | mechanical test | |
| | weight | percent- | weight | percent- | pressed | | kama- | pressed | | kama- | sensory | | |
| test plots | (kg) | age (%) | (kg) | age (%) | meat | surimi | boko | meat | surimi | boko | test | W (g) | L (cm) |
| 1. NaCl (I.S = 0.05) | 20.0 | 28.6 | 2.5 | 64.1 | 87.7 | 82.3 | 77.2 | 7.32 | 7.65 | 7.32 | 5.6 | 283 | 1.21 |
| 2. NaCl (I.S = 0.04) $MgCl_2$ (I.S = 0.01) | 17.3 | 24.7 | 2.7 | 69.2 | 84.6 | 79.6 | 74.5 | 7.30 | 7.54 | 7.30 | 6.7 | 447 | 1.17 |
| 3. NaCl (I.S = 0.04) $MgCl_2$ (I.S = 0.005) $CaCl_2$ (I.S = 0.005) | 16.5 | 23.6 | 2.6 | 66.7 | 84.3 | 79.1 | 74.3 | 7.28 | 7.56 | 7.28 | 7.0 | 466 | 1.24 |
| 4. NaCl (I.S = 0.04) $CaCl_2$ (I.S = 0.01) | 15.6 | 22.3 | 2.5 | 64.1 | 83.8 | 79.1 | 74.0 | 7.30 | 7.58 | 7.30 | 7.1 | 509 | 1.114 |

*weight of fish meat from refiner: 70 kg
*weight of solid in fish meat from refiner: 3.9 kg From this result, it is seen that the combination of NaCl with $MgCl_2$ and/or $CaCl_2$ brings about a more remarkable improvement in the dehydrating effect than in the single use of NaCl, and also that the combination rheometer (produced by Fudo Kogyo Co.) using a spherical plunger of 5 mm in diameter. W(g): load at the time of break. L(cm): length of intrusion (depth of hollow) of the plunger at the time of break.

TABLE 4

| | yield | | | | water content (%) | | | pH | | | elasticity of kamaboko | | |
|---|---|---|---|---|---|---|---|---|---|---|---|---|---|
| | pressed meat | | solid in pressed meat | | | | | | | | | mechanical test | |
| | weight | percent- | weight | percent- | pressed | | kama- | pressed | | kama- | sensory | | |
| test plots | (kg) | age (%) | (kg) | age (%) | meat | surimi | boko | meat | surimi | boko | test | W (g) | L (cm) |
| 1. NaCl (I.S = 0.05) | 17.1 | 28.5 | 2.2 | 62.9 | 87.2 | 82.1 | 76.3 | 7.30 | 7.60 | 7.31 | 5.8 | 305 | 1.20 |
| 2. NaCl (I.S = 0.04) $MgSO_4$ (I.S = 0.01) | 15.0 | 25.0 | 2.4 | 68.6 | 84.0 | 79.1 | 73.5 | 7.30 | 7.55 | 7.30 | 7.0 | 480 | 1.18 |

TABLE 4-continued

| | | yield | | | | | | | | | elasticity of kamaboko | | |
|---|---|---|---|---|---|---|---|---|---|---|---|---|---|
| | | pressed meat | | solid in pressed meat | | water content (%) | | | pH | | | | mechanical test |
| test plots | | weight (kg) | percent- age (%) | weight (kg) | percent- age (%) | pressed meat | surimi | kama- boko | pressed meat | surimi | kama- boko | sensory test | W (g) | L (cm) |
| 3. NaCl (I.S = 0.04) MgSO₄ (I.S = 0.005) CaSO₄ (I.S = 0.005) | | 14.8 | 24.7 | 2.4 | 68.6 | 83.8 | 75.1 | 73.3 | 7.28 | 7.54 | 7.29 | 7.1 | 500 | 1.16 |
| 4. NaCl (I.S = 0.04) CaSO₄ (I.S = 0.01) | | 14.2 | 23.7 | 2.4 | 68.6 | 83.2 | 78.3 | 72.8 | 7.30 | 7.57 | 7.31 | 7.3 | 550 | 1.12 |

*weight of fish meat from refiner: 60 kg
*weight of solid in fish meat from refiner: 3.5 kg From this result, it is seen that the combination of NaCl with MgSO$_4$ and/or CaSO$_4$ brings about a more remarkable improvement in the dehydrating effect than in the single use of NaCl, and also that the combination of NaCl with MgSO$_4$ improves the yield of solid matter of the pressed meat, inhibits the elution of proteins and besides has little effect on the elasticity (L value) of "kamaboko".

EXAMPLE 5

Using walleye pollack of a little low freshness which had been carried in as dress the day before test and cold-stored in a stock tank for one night, fish meat from refiner was produced and adjusted in a mixer so that the water distribution was uniform in the same manner as in Example 1, and then divided into portions of 52 kg each. The water content of this fish meat from refiner was 94.3%. Thereafter, 52 kg each of the fish meat from refiner was added to washing tanks containing 104 liters of aqueous solutions (twice the fish meat from refiner) of NaCl, a liquid preparation A (NaCl, 19.9%; MgCl$_2$.6H$_2$O, 5.8%; Na$_2$CO$_3$, 0.01%; H$_2$O, 74.29%), a powdery preparation B (NaCl, 77.5%; MgCl$_2$.6H$_2$O, 22.5%) and a powdery preparation C (NaCl, 77%; MgCl$_2$.6H$_2$O, 22%; NaHCO$_3$, 1%), respectively, of which the concentration (ion strength) was adjusted as shown in Table 5. Every mixture was stirred and mixed for 5 minutes, pre-dehydrated on a rotary sieve and then dehydrated on a small screw press by applying the same number of revolutions (notch, 0.4) to obtain pressed meat of every test plot. In the same manner as in Example 1, frozen "surimi" and "kamaboko" were produced from this pressed meat and tested in the same manner as in Example 3. The result is shown in Table 5.

As may be seen from this result, the preparations A, B and C are superior in the dehydrating effect to NaCl, give a good yield of solid matter of the pressed meat and has an effect to inhibit the elution of proteins. Also, by using the preparations A and C containing NaHCO$_3$ and Na2CO$_3$, respectively, as an alkali agent in addition to NaCl and MgCl$_2$, to adjust the pH of fish meat at the time of washing, the elasticity of "kamaboko" becomes better, i.e. becomes higher in the L value, than does the preparation B containing no alkali agent necessary to adjust the pH.

EXAMPLE 6

In the same manner as in Example 2, fish meat from refiner was produced and adjusted in a mixer so that the water distribution was uniform, and divided into portions of 60 kg each. The water content of this fish meat from refiner was 93.7%. thereafter, 60 kg each of the fish meat from refiner was added to washing tanks containing 120 liters of aqueous solutions (twice the fish meat from refiner) of NaCl, a liquid preparation A (NaCl, 19.9%; MgSO$_4$. 7H$_2$O, 5.8%; Na$_2$CO$_3$, 0.01%; H$_2$O, 74.29%), a powdery preparation B (NaCl, 80%; MgSO$_4$.7H$_2$O, 20%) and a powdery preparation C (NaCl, 79%; MgSO$_4$.7H$_2$O, 20%; NaHCO$_3$, 1%), respectively, of which the the concentration (ion strength) was adjusted as shown in Table 6. Every mixture was stirred and mixed for 5 minutes, pre-dehydrated on a rotary sieve and then dehydrated on a small screw press by applying the same number of revolutions (notch, 0.4) to obtain pressed meat of every test plot. In the same manner as in Example 2, frozen "surimi" and "kamaboko" were produced from this pressed meat and

TABLE 5

| | yield | | | | | | | | | | elasticity of kamaboko | | |
|---|---|---|---|---|---|---|---|---|---|---|---|---|---|
| | pressed meat | | solid in pressed meat | | water content (%) | | | pH | | | | mechanical test | |
| test plots | weight (kg) | percent- age (%) | weight (kg) | percent- age (%) | pressed meat | surimi | kama- boko | pressed meat | surimi | kama- boko | sensory test | W (g) | L (cm) |
| 1. NaCl (I.S = 0.05) | 14.9 | 28.7 | 2.28 | 77.0 | 84.6 | 79.7 | 74.3 | 7.27 | 7.60 | 7.18 | 6.1 | 412 | 1.05 |
| 2. A (I.S = 0.05) | 14.2 | 27.3 | 2.30 | 77.7 | 83.8 | 78.4 | 73.1 | 7.31 | 7.54 | 7.14 | 6.9 | 513 | 1.10 |
| 3. B (I.S = 0.05) | 14.0 | 26.9 | 2.29 | 77.4 | 83.6 | 78.1 | 73.1 | 7.27 | 7.49 | 7.10 | 6.9 | 524 | 1.05 |
| 4. C (I.S = 0.05) | 14.5 | 27.9 | 2.36 | 79.7 | 83.7 | 78.7 | 73.3 | 7.33 | 7.56 | 7.16 | 6.9 | 512 | 1.08 |

*weight of fish meat from refiner: 52 kg
*weight of solid in fish meat from refiner: 2.96 kg tested in the same manner as in Example 4. The result is shown in Table 6.

matter of the pressed meat and inhibits the elution of proteins at the time of dehydration.

TABLE 6

| | yield | | | | water content (%) | | | pH | | | elasticity of kamaboko | | |
|---|---|---|---|---|---|---|---|---|---|---|---|---|---|
| | pressed meat | | solid in pressed meat | | | | | | | | | mechanical test | |
| test plots | weight (kg) | percent- age (%) | weight (kg) | percent- age (%) | pressed meat | surimi | kama- boko | pressed meat | surimi | kama- boko | sensory test | W (g) | L (cm) |
| 1. NaCl (I.S = 0.05) | 18.0 | 30.0 | 2.4 | 63.2 | 86.8 | 81.7 | 76.0 | 7.25 | 7.60 | 7.16 | 5.8 | 385 | 1.15 |
| 2. A (I.S = 0.05) | 17.4 | 29.0 | 2.8 | 73.7 | 84.0 | 79.0 | 73.3 | 7.28 | 7.55 | 7.14 | 7.0 | 505 | 1.17 |
| 3. B (I.S = 0.05) | 17.1 | 28.5 | 2.8 | 73.7 | 83.8 | 78.9 | 73.3 | 7.24 | 7.50 | 7.10 | 7.0 | 515 | 1.11 |
| 4. C (I.S = 0.05) | 17.6 | 29.3 | 2.8 | 73.7 | 84.0 | 79.1 | 73.6 | 7.29 | 7.56 | 7.15 | 7.0 | 500 | 1.15 |

*weight of fish meat from refiner: 60 kg
*weight of solid in fish meat from refiner: 3.8 kg As may be seen from this result, the preparations A, B and C are superior in the dehydrating effect to NaCl, give a good yield of solid matter of the pressed meat and has an effect to inhibit the elution of proteins. also, by using the preparations A and C containing $NaHCO_3$ and $Na_2CO_3$, respectively, as an alkali agent in addition to NaCl and $MgSO_4$, to adjust the pH of fish meat at the time of washing, the elasticity of "kamaboko" becomes better, i.e. becomes higher in the L value, than does the preparation B containing no alkali agent necessary to adjust the pH.

EXAMPLE 7

In the same manner as in Example 1, fish meat from refiner was produced and adjusted in a mixer so that the water distribution was uniform, and divided into portions of 60 kg each. The water content of this fish meat from refiner was 94.0%. Thereafter, 60 kg each of the fish meat from refiner was added to washing tanks containing 120 liters of aqueous solutions (twice the fish meat from refiner) of Nacl and a preparation (NaCl, 70%; $MgCl_2.6H_2O$, 29%; $K_2CO_3$, 1%), respectively, of which the concentration (ion strength) was adjusted as shown in Table 7. Every mixture was stirred and mixed for 5 minutes, pre-dehydrated on a rotary sieve and then dehydrated on a small screw press by applying the same number of revolutions (notch, 0.4) to obtain pressed meat of every test plot. The result is shown in table 7.

TABLE 7

| | yield | | | | water content |
|---|---|---|---|---|---|
| | pressed meat | | solid in pressed meat | | |
| test plots | weight (kg) | percent- age (%) | weight (kg) | percent- age (%) | of pressed meat (%) |
| 1. NaCl (I.S = 0.05) | 19.7 | 32.8 | 2.6 | 69.4 | 87.1 |
| 2. preparation 0.15% (I.S = 0.025) | 18.1 | 30.2 | 2.5 | 69.4 | 86.4 |
| 3. preparation 0.30% (I.S = 0.05) | 16.4 | 27.3 | 2.6 | 72.2 | 84.4 |
| 4. preparation 0.45% (I.S = 0.075) | 15.5 | 25.8 | 2.7 | 75.0 | 82.9 |

*weight of fish meat from refiner: 60 kg
*weight of solid in fish meat from refiner: 3.6 kg From this result, it is seen that the present preparation has a dehydrating effect, improves the yield of solid matter of the pressed meat and inhibits the elution of proteins at the time of dehydration.

EXAMPLE 8

In the same manner as in Example 2, fish meat from refiner was produced and adjusted in a mixer so that the water distribution was uniform, and divided into portions of 60 kg each. The water content of this fish meat from refiner was 94.3%. Thereafter, 60 kg each of the fish meat from refiner was added to washing tanks containing 120 liters of aqueous solutions (twice the fish meat from refiner) of NaCl and a prepration (NaCl, 79%; $MgSO_4.7H_2O$, 20%; $K_2CO_3$, 1%), respectively, of which the concentration (ion strength) was adjusted as shown in Table 8. Every mixture was stirred and mixed for 5 minutes, pre-dehydrated on a rotary sieve and then dehydrated on a small screw press by applying the same number of revolutions (notch, 0.4) to obtain pressed meat of every test plot. The result is shown in Table 8.

TABLE 8

| | yield | | | | water content |
|---|---|---|---|---|---|
| | pressed meat | | solid in pressed meat | | |
| test plots | weight (kg) | percent- age (%) | weight (kg) | percent- age (%) | of pressed meat (%) |
| 1. NaCl (I.S = 0.05) | 18.7 | 31.2 | 2.4 | 70.6 | 86.9 |
| 2. preparation 0.15% (I.S = 0.025) | 18.2 | 30.3 | 2.6 | 76.5 | 85.7 |
| 3. preparation 0.30% (I.S = 0.05) | 17.3 | 28.8 | 2.7 | 79.4 | 84.5 |
| 4. preparation 0.45% (I.S = 0.075) | 16.1 | 26.8 | 2.8 | 82.4 | 82.8 |

*weight of fish meat from refiner: 60 kg
*weight of solid in fish meat from refiner: 3.4 kg From this result, it is seen that the present preparation has a dehydrating effect, improves the yield of solid matter of the pressed meat and inhibits the elution of proteins at the time of dehydration.

EXAMPLE 9

In the same manner as Example 1, fish meat from refiner was produced and adjusted in a mixer so that the water distribution was uniform, and divided into portions of 70 kg each. The water content of this fish meat from refiner was 93.5%. Thereafter, 70 kg each of the fish meat from the refiner was added to washing tanks containing 140 liters of aqueous solutions (twice the fish meat from refiner) of NaCl and a preparation (NaCl, 75%; MgCl$_2$.6H$_2$O, 24%; NaHCO$_3$, 1%), respectively, of which the concentration (ion strength) was adjusted as shown in Table 9. Every mixture was stirred and mixed for 5 minutes, pre-dehydrated on a rotary sieve and then dehydrated on a small screw press by changing the number of revolutions (notch) to obtain pressed meat of every test plot. In the same manner as in Example 1, frozen "surimi" and "kamaboko" were produced from this pressed meat and tested in the same manner as in Example 3. The result is shown in Table 9.

of the test plot No. 1 with that of the test plot No. 4 having almost the same water content as the former, the elasticity of the latter (No. 4) is better than that of the former (No. 1).

EXAMPLE 10

In the same manner as in Example 2, fish meat from refiner was produced and adjusted in a mixer so that the water distribution was uniform, and divided into portions of 60 kg each. The water content of this fish meat from refiner was 93.9%. Thereafter, 60 kg each of the

TABLE 9

| test plots | screw press (notch) | dehydrating time (minute) | yield pressed meat weight (kg) | yield pressed meat percentage (%) | yield solid in pressed meat weight (kg) | yield solid in pressed meat percentage (%) | water content (%) pressed meat | water content (%) surimi | water content (%) kamaboko |
|---|---|---|---|---|---|---|---|---|---|
| 1. NaCl (I.S = 0.05) | 0.4 | 70 | 22.8 | 32.6 | 3.0 | 65.2 | 86.9 | 82.0 | 76.8 |
| 2. preparation (I.S = 0.05) | 0.4 | 50 | 19.8 | 28.3 | 3.1 | 67.4 | 84.4 | 79.3 | 74.4 |
| 3. preparation (I.S = 0.05) | 0.5 | 47 | 22.3 | 31.9 | 3.3 | 71.7 | 85.0 | 80.1 | 75.1 |
| 4. preparation (I.S = 0.05) | 0.6 | 41 | 24.0 | 34.3 | 3.3 | 71.7 | 86.3 | 81.7 | 76.5 |

| test plots | pH pressed meat | pH surimi | pH kamaboko | elasticity of kamaboko sensory test | elasticity of kamaboko mechanical test W (g) | elasticity of kamaboko mechanical test L (cm) |
|---|---|---|---|---|---|---|
| 1. NaCl (I.S = 0.05) | 7.33 | 7.58 | 7.34 | 5.5 | 278 | 1.22 |
| 2. preparation (I.S = 0.05) | 7.28 | 7.52 | 7.24 | 6.6 | 472 | 1.18 |
| 3. preparation (I.S = 0.05) | 7.30 | 7.53 | 7.27 | 6.4 | 400 | 1.18 |
| 4. preparation (I.S = 0.05) | 7.37 | 7.56 | 7.30 | 6.0 | 330 | 1.19 |

*weight of fish meat from refiner: 70 kg
*weight of solid in fish meat from refiner: 4.6 kg From this result, the following effects may be observed: When the number of revolutions of the screw press is made equal to that in the test plot No. 1, the preparation exhibits a very large dehydrating effect, resulting in a remarkably shortened dehydrating time. It is also possible to relax squeezing by increasing the number of revolutions, and in this case, the dehydrating effect is more or less reduced, but the dehydrating time is further shortened. That is, the dehydration efficiency, in other words, production efficiency can be improved by using the preparation as a dehydrating reagent. Also, because the yield of solid matter of the pressed meat is increased, the elution of proteins at the time of dehydration is inhibited. Further, in comparison of "kamaboko"

fish meat from refiner was added to washing tanks containing 120 liters of aqueous solutions (twice the fish meat from refiner) of NaCl and a preparation (NaCl, 75%; MgSO$_4$.7H$_2$O, 24%; NaHCO$_3$, 1%), respectively, of which the concentration (ion strength) was adjusted as shown in Table 10. Every mixture was stirred and mixed for 5 minutes, pre-dehydrated on a rotary sieve and then dehydrated on small screw press by changing the number of revolutions (notch) to obtain pressed meat of every test plot. In the same manner as in Example 2, frozen "surimi" and "kamaboko" were produced from this pressed meat and tested in the same manner as in Example 4. The result is shown in Table 10.

TABLE 10

| test plots | screw press (notch) | dehydrating time (minute) | yield pressed meat weight (kg) | yield pressed meat percentage (%) | yield solid in pressed meat weight (kg) | yield solid in pressed meat percentage (%) | water content (%) pressed meat | water content (%) surimi | water content (%) kamaboko |
|---|---|---|---|---|---|---|---|---|---|
| 1. NaCl (I.S = 0.05) | 0.4 | 56 | 19.8 | 33.0 | 2.7 | 73.0 | 86.5 | 81.4 | 75.7 |
| 2. preparation (I.S = 0.05) | 0.4 | 34 | 17.8 | 29.7 | 2.8 | 75.7 | 84.0 | 79.1 | 73.5 |
| 3. preparation (I.S = 0.05) | 0.5 | 30 | 19.2 | 32.0 | 2.9 | 78.4 | 84.8 | 79.8 | 74.2 |
| 4. preparation (I.S = 0.05) | 0.6 | 25 | 20.8 | 34.7 | 2.9 | 78.4 | 86.1 | 81.0 | 75.4 |

| test plots | pH pressed meat | pH surimi | pH kamaboko | elasticity of kamaboko sensory test | elasticity of kamaboko mechanical test W (g) | elasticity of kamaboko mechanical test L (cm) |
|---|---|---|---|---|---|---|
| 1. NaCl (I.S = 0.05) | 7.31 | 7.60 | 7.35 | 6.0 | 310 | 1.22 |
| 2. preparation | 7.30 | 7.55 | 7.25 | 7.0 | 500 | 1.20 |

TABLE 10-continued

|   |   |   |   |   |   |   |
|---|---|---|---|---|---|---|
| 3. preparation (I.S = 0.05) | 7.32 | 7.57 | 7.36 | 6.8 | 442 | 1.21 |
| 4. preparation (I.S = 0.05) | 7.35 | 7.59 | 7.32 | 6.5 | 345 | 1.21 |

*weight of fish meat from refiner: 60 kg
*weight of solid in fish meat from refiner: 3.7 kg From this result, the following effects may be observed: When the number of revolutions of the screw press is made equal to that in the test plot No. 1, the preparation exhibits a very large dehydrating effect, resulting in a remarkably shortened dehydrating time. It is also possible to relax squeezing by increasing the number of revolutions, and in this case, the dehydrating effect is more or less reduced, but the dehydrating time is further shortened. That is, the dehydration efficiency, in other words, production efficiency can be improved by using the preparation as a dehydrating reagent. Also, because the yield of solid matter of the pressed meat is increased, the elution of proteins at the time of dehydration is inhibited. Further, in comparison of "kamaboko" of the test plot No. 1 with that of the test plot No. 4 having almost the same water content as the former, the elasticity of the latter (No. 4) is better than that of the former (No. 1).

EXAMPLE 11

In the same manner as in Example 5, fish meat from refiner was produced and adjusted in a mixer so that the water distribution was uniform, and divided into portions of 50 kg each. The water content of this fish meat from refiner was 94.1%. Thereafter, 50 kg each of the fish meat from refiner was added to washing tanks containing 100 liters of aqueous solutions (twice the fish meat from refiner) of which the ionic strength (I.S) was adjusted to 0.05 with mixtures of NaCl, $MgCl_2.6H_2O$ and $NaHCO_3$ in varying proportions as shown in Table 11, respectively. Every mixture was stirred and mixed for 5 minutes, pre-dehydrated on a rotary sieve and then dehydrated on a small screw press by applying the same number of revolutions (notch, 0.4) to obtain pressed meat of every test plot. In the same manner as in Example 1, frozen "surimi" and "kamaboko" were produced from this pressed meat and tested in the same manner as in Example 1. The result is shown in Table 11.

TABLE 11

| | proportion of preparation (%) | | | yield | | | | water content (%) | | | pH | | |
|---|---|---|---|---|---|---|---|---|---|---|---|---|---|
| | | | | pressed meat | | solid in pressed meat | | | | | | | |
| test plots | NaCl | $MgCl_2.6H_2O$ | $NaHCO_3$ | weight (kg) | percentage (%) | weight (kg) | percentage (%) | pressed meat | surimi | kamaboko | pressed meat | surimi | kamaboko |
| 1. Control | 100 | 0 | 0 | 14.3 | 28.6 | 2.13 | 72.2 | 85.1 | 80.1 | 74.2 | 7.30 | 7.60 | 7.21 |
| 2. present invention | 77.5 | 22.5 | 0 | 13.5 | 27.0 | 2.19 | 74.2 | 83.8 | 78.7 | 72.9 | 7.27 | 7.48 | 7.14 |
| 3. present invention | 77 | 22 | 1 | 13.9 | 27.8 | 2.21 | 74.9 | 84.1 | 79.2 | 73.3 | 7.32 | 7.54 | 7.18 |
| 4. present invention | 75 | 22 | 3 | 14.0 | 28.0 | 2.20 | 74.5 | 84.3 | 79.4 | 73.5 | 7.38 | 7.63 | 7.25 |
| 5. present invention | 73 | 22 | 5 | 14.1 | 28.2 | 2.17 | 73.6 | 84.6 | 79.6 | 73.8 | 7.48 | 7.68 | 7.31 |
| 6. present invention | 68 | 22 | 10 | 14.2 | 28.4 | 2.14 | 72.5 | 84.8 | 79.9 | 74.0 | 7.57 | 7.75 | 7.40 |
| 7. present invention | 63 | 22 | 15 | 14.8 | 29.6 | 2.11 | 71.5 | 85.5 | 80.6 | 74.7 | 7.74 | 7.81 | 7.55 |

*weight of fish meat from refiner: 50 kg
*weight of solid in fish meat from refiner: 2.95 kg From this result, it is seen that, by adding $NaHCO_3$ to the combination of NaCl and $MgCl_2$, the pH of the pressed meat, "surimi" and "kamaboko" can be made equal to that in the control plot, but increasing the amount of $NaHCO_3$ added leads to a reduction in the dehydrating effect and the effect to inhibit the elution of solid matters from the pressed meat.

EXAMPLE 12

In the same manner as in Example 2, fish meat from refiner was produced and adjusted in a mixer so that the water distribution was uniform, and divided into portions of 60 kg each. The water content of this fish meat from refiner was 94.5%. Thereafter, 60 kg each of the fish meat from refiner was added to washing tanks containing 120 liters of aqueous solutions (twice the fish meat from refiner) of which the ionic strength (I.S) was adjusted to 0.05 with mixtures of NaCl, $MgSO_4.7H_2O$ and $NaHCO_3$ in varying proportions as shown in Table 12, respectively. Every mixture was stirred and mixed for 5 minutes, pre-dehydrated on a rotary sieve and then dehydrated on a small screw press by applying the same number of revolutions (notch, 0.4) to obtain pressed meat of every test plot. In the same manner as in Example 2, frozen "surimi" and "kamaboko" were produced from this pressed meat and tested in the same manner as in Example 2. The result is shown in Table 12.

TABLE 12

| test number | proportion of preparation (%) | | | yield | | | | water content (%) | | | pH | | |
|---|---|---|---|---|---|---|---|---|---|---|---|---|---|
| | | | | pressed meat | | solid in pressed meat | | | | | | | |
| | NaCl | MgCl$_2$.7H$_2$O | NaHCO$_3$ | weight (kg) | percentage (%) | weight (kg) | percentage (%) | pressed meat | suri-mi | kama-boko | pressed meat | suri-mi | kama-boko |
| 1. Control | 100 | 0 | 0 | 17.8 | 29.6 | 2.39 | 72.4 | 86.6 | 81.5 | 75.8 | 7.31 | 7.59 | 7.20 |
| 2. present invention | 80 | 20 | 0 | 16.9 | 28.2 | 2.54 | 77.0 | 85.0 | 80.0 | 74.4 | 7.28 | 7.50 | 7.15 |
| 3. present invention | 79 | 20 | 1 | 17.5 | 29.2 | 2.57 | 77.9 | 85.3 | 80.3 | 74.7 | 7.31 | 7.55 | 7.19 |
| 4. present invention | 77 | 20 | 3 | 17.8 | 29.6 | 2.55 | 77.3 | 85.7 | 80.7 | 75.0 | 7.37 | 7.63 | 7.20 |
| 5. present invention | 75 | 20 | 5 | 17.9 | 29.8 | 2.52 | 76.4 | 85.9 | 80.8 | 75.2 | 7.50 | 7.70 | 7.32 |
| 6. present invention | 70 | 20 | 10 | 17.9 | 29.8 | 2.42 | 73.3 | 86.5 | 81.4 | 75.7 | 7.57 | 7.75 | 7.44 |
| 7. present invention | 65 | 20 | 15 | 18.1 | 30.2 | 2.35 | 71.2 | 87.0 | 81.9 | 76.1 | 7.61 | 7.80 | 7.60 |

*weight of fish meat from refiner: 60 kg
*weight of solid in fish meat from refiner: 3.30 kg From this result, it is seen that, by adding NaHCO$_3$ to the combination of NaCl and MgSO$_4$, the pH of the pressed meat, "surimi" and "kamaboko" can be made equal to that in the control plot, but increasing the amount of NaHCO$_3$ added leads to a reduction in the dehydrating effect and the effect to inhibit the elution of solid matters from the pressed meat.

EXAMPLE 13

In the same manner as in Example 2, fish meat from refiner was produced and adjusted in a mixer so that the water distribution was uniform, and divided into portions of 60 kg each. The water content of this fish meat from refiner was 93.5%. Thereafter, 60 kg each of the fish meat from refiner was added to washing tanks containing 120 liters of aqueous solutions (twice the fish meat from refiner) of which the ionic strength (I.S) was adjusted to values shown in Table 13 with the combination of NaCl, MgCl$_2$, CaCl$_2$, MgSO$_4$ and CaSO$_4$ in varying proportions as shown in Table 12, respectively. Every mixture was stirred and mixed for 5 minutes, pre-dehydrated on a rotary sieve and then dehydrated on a small screw press by applying the same number of revolutions (notch, 0.4) to obtain pressed meat of every test plot. In the same manner as in Example 2, frozen "surimi" and "kamaboko" were produced from this pressed meat and tested in the same manner as in Example 2. The result is shown in Table 13.

TABLE 13

| test plot | yield | | | | water content (%) | | | pH | | | sensory test | elasticity of kamaboko mechanical test | |
|---|---|---|---|---|---|---|---|---|---|---|---|---|---|
| | pressed meat | | solid in pressed meat | | | | | | | | | | |
| | weight (kg) | percentage (%) | weight (kg) | percentage (%) | pressed meat | suri-mi | kama-boko | pressed meat | suri-mi | kama-boko | | W (g) | L (cm) |
| 1. NaCl (I.S = 0.05) | 18.5 | 30.8 | 2.4 | 61.5 | 87.0 | 81.9 | 76.1 | 7.33 | 7.62 | 7.35 | 5.8 | 311 | 1.21 |
| 2. NaCl (I.S = 0.04) MgCl$_2$ (I.S = 0.005) MgSO$_4$ (I.S = 0.005) | 16.0 | 26.7 | 2.6 | 66.7 | 83.8 | 78.9 | 73.3 | 7.31 | 7.50 | 7.30 | 7.0 | 500 | 1.18 |
| 3. NaCl (I.S = 0.04) MgCl$_2$ (I.S = 0.005) CaSO$_4$ (I.S = 0.005) | 15.3 | 25.5 | 2.5 | 64.1 | 83.7 | 78.8 | 73.3 | 7.30 | 7.51 | 7.30 | 7.0 | 508 | 1.15 |
| 4. NaCl (I.S = 0.04) CaCl$_2$ (I.S = 0.005) MgSO$_4$ (I.S = 0.005) | 15.1 | 25.2 | 2.5 | 64.1 | 83.4 | 78.5 | 73.0 | 7.31 | 7.52 | 7.31 | 7.1 | 530 | 1.14 |
| 5. NaCl (I.S = 0.04) CaCl$_2$ (I.S = 0.005) CaSO$_4$ (I.S = 0.005) | 14.1 | 23.5 | 2.4 | 61.5 | 83.0 | 78.1 | 72.6 | 7.31 | 7.51 | 7.32 | 7.2 | 545 | 0.13 |
| 6. NaCl (I.S = 0.04) MgCl$_2$ (I.S = 0.0025) CaCl$_2$ (I.S = 0.0025) MgSO$_4$ | 15.2 | 25.3 | 2.5 | 64.1 | 83.5 | 78.6 | 73.1 | 7.31 | 7.51 | 7.31 | 7.0 | 520 | 1.15 |

TABLE 13-continued

| test plot | yield | | | | water content (%) | | | pH | | | elasticity of kamaboko | | |
|---|---|---|---|---|---|---|---|---|---|---|---|---|---|
| | pressed meat | | solid in pressed meat | | | | | | | | sensory test | mechanical test | |
| | weight (kg) | percentage (%) | weight (kg) | percentage (%) | pressed meat | suri-mi | kama-boko | pressed meat | suri-mi | kama-boko | | W (g) | L (cm) |
| (I.S = 0.0025) CaSO₄ (I.S = 0.0025) | | | | | | | | | | | | | |

*weight of fish meat from refiner: 60 kg
*weight of solid in fish meat from refiner: 3.9 kg From this result, it is seen that the combination of NaCl and chlorides such as MgCl and CaCl₂ with sulfate such as MgSO₄ and CaSO₄ effects more excellent dehydration than NaCl alone does. In addition the combination of NaCl and MgCl₂ with MgSO₄ improves the yield of solid in dehydrated meat to inhibit the elution of protein, and rarely affects on the elasticity of fish-paste product such as kamaboko.

What is claimed is:

1. A method for dehydrating fish comprising:
   washing the fish one or more times in an aqueous solution, said solution containing from about 0.05 to 1.0% by weight of a dehydrating reagent, said dehydrating reagent comprising:
   (A) an alkaline earth metal salt selected from the group consisting of magnesium chloride, calcium chloride, magnesium sulfate and calcium sulfate; and
   (B) sodium chloride in the proportion of 1 part by weight to 0.5 to 40 parts by weight of (A) to (B).

2. A method according to claim 1, further comprising a water-washing step of washing said fish one or more times with water to improve elasticity and whiteness of the fish, said water-washing step preceding said step of washing in an aqueous solution containing a dehydrating reagent.

3. A method according to claim 1, further comprising adding to said dehydrating reagent an alkaline material as a pH value controlling agent.

4. A method according to claim 2, further comprising adding to said dehydrating reagent an alkaline material as a pH value controlling agent.

5. A method according to claim 3, wherein the alkaline material is selected from the group consisting of sodium hydrogen carbonate, sodium carbonate, potassium carbonate, sodium citrate and sodium acetate.

6. a method according to claim 4, wherein the alkaline material is selected from the group consisting of sodium hydrogen carbonate, sodium carbonate, potassium carbonate, sodium citrate and sodium acetate.

7. A method according to claim 2, wherein the water content of said fish after said water-washing step is from about 93.5% to about 94.5%.

8. A method according to claim 2, wherein the water content of said fish after said step of washing in an aqueous solution containing dehydration reagent is from about 81.5% to about 88.0%.

9. A method according to claim 1, wherein the dehydrating reagent consists essentially of 1 part by weight of magnesium chloride or calcium chloride.

10. A method according to claim 2, wherein the dehydrating reagent consists essentially of 1 part by weight of magnesium chloride or calcium chloride.

11. A method according to claim 1, wherein the dehydrating reagent consists essentially of (A) 1 part by weight of magnesium sulfate or calcium sulfate and (B) 0.5 to 40 parts by weight of sodium chloride.

12. A method to claim 2, wherein the dehydrating reagent consists essentially of (A) 1 part by weight of magnesium sulfate or calcium sulfate and (B) 0.5 to 40 parts by weight of sodium chloride.

13. A method according to claim 3, wherein the content of the alkaline material is not more than 10% by weight based upon the total weight of (A) and (B).

14. A method according to claim 4, wherein the content of the alkaline material is not more than 10% by weight based upon the total weight of (A) and (B).

* * * * *